United States Patent
Leopold

(10) Patent No.: US 8,919,484 B2
(45) Date of Patent: Dec. 30, 2014

(54) DRIVE ARRANGEMENT FOR AUTOMOBILE

(75) Inventor: Frank Leopold, Taunusstein-Orlen (DE)

(73) Assignee: GM Global Technology Operations LLC, Detroit, MI (US)

( * ) Notice: Subject to any disclaimer, the term of this patent is extended or adjusted under 35 U.S.C. 154(b) by 549 days.

(21) Appl. No.: 13/095,623

(22) Filed: Apr. 27, 2011

(65) Prior Publication Data

US 2011/0266083 A1 Nov. 3, 2011

(30) Foreign Application Priority Data

Apr. 28, 2010 (DE) .......................... 10 2010 018 469

(51) Int. Cl.
*B60K 5/04* (2006.01)
*B62D 23/00* (2006.01)
*B60K 17/06* (2006.01)
*B62D 25/20* (2006.01)

(52) U.S. Cl.
CPC . *B60K 5/04* (2013.01); *B62D 23/00* (2013.01); *B60K 17/06* (2013.01); *B62D 25/2009* (2013.01)
USPC ......... 180/291; 180/292; 180/297; 180/65.21

(58) Field of Classification Search
USPC ........... 180/291, 292, 297, 298, 65.21, 65.22, 180/311, 312
See application file for complete search history.

(56) References Cited

U.S. PATENT DOCUMENTS

| 4,216,839 | A | * | 8/1980 | Gould et al. ................. 180/65.1 |
| 5,143,167 | A | * | 9/1992 | Moriyama et al. ............ 180/248 |
| 5,156,070 | A | | 10/1992 | Fukuda et al. |
| 5,287,942 | A | | 2/1994 | Maebayashi et al. |
| 5,704,644 | A | * | 1/1998 | Jaggi .............................. 280/796 |
| 5,915,494 | A | * | 6/1999 | Matsumura et al. .......... 180/232 |
| 6,079,937 | A | | 6/2000 | Cook |

FOREIGN PATENT DOCUMENTS

| DE | 69002394 T2 | 11/1993 |
| DE | 4421926 A1 | 1/1996 |
| DE | 102008050574 A1 | 4/2010 |
| EP | 473146 A | * 3/1992 |
| JP | 4339021 A | 12/2004 |

OTHER PUBLICATIONS

German Patent Office, German Search Report for German Application No. 102010018469.1, dated Feb. 24, 2011.

* cited by examiner

*Primary Examiner* — Katy M Ebner
(74) *Attorney, Agent, or Firm* — Ingrassia Fisher & Lorenz, P.C.

(57) ABSTRACT

An automobile is provided with a body, a combustion engine and a transmission operationally connected to the engine. The crankshaft of the engine is substantially oriented in vehicle transverse direction and the engine seen in driving direction of the vehicle is arranged behind the transmission.

18 Claims, 2 Drawing Sheets

DRIVE ARRANGEMENT FOR AUTOMOBILE

CROSS-REFERENCE TO RELATED APPLICATION

This application claims priority to German Patent Application No. 102010018469.1, filed Apr. 28, 2010, which is incorporated herein by reference in its entirety.

TECHNICAL FIELD

The technical field relates to a drive arrangement and to an installation space allocation concept for an automobile, particularly for an automobile.

BACKGROUND

Preferably optimal utilization of the installation space, which in an automobile (PKW) is only available to a limited extent anyhow, is of major importance in the new development of vehicles. Optimized installation space utilization plays a dominating role particularly in the case of small and smallest vehicles even because of the comparatively small outer dimensions of the vehicle. In addition, particularly hybrid drive concepts wherein combustion engines are coupled to alternative drives particularly electric motors, create additional demands in terms of the installation space allocation of the automobile.

With known drive concepts for compact vehicles a substantial weight component of the vehicle drive is additionally located in front of the front axle, which altogether can lead to deficiencies of space utilization and the vehicle behavior on the road. The geometrical dimensions of drives such as engine and transmission require a positioning in front of the front axle of the automobile. Added to this is that the vehicle radiator because of the required fresh air supply is to be arranged on the vehicle front in front of the drive. Such installation space concepts in the recent past resulted in a steadily increasing vehicle front overhang with a correspondingly disadvantageous weight distribution. In addition, pedestrian protection regulations and insurance classifications have additional effects on the installation space allocation of the automobile; so that the vehicle front overhang relative to the vehicle interior space in general is comparatively long.

It is therefore at least one aim particularly in the case of small cars to preferably shorten the vehicle front overhang which, however, because of the radiator arrangement of necessity located in front of the drive engine, is often possible only conditionally. Alternative installation space concepts, where an engine is arranged in the back of the vehicle, result in a center of gravity and weight shift which is not advantageous particularly for small cars, which is particularly reflected in an unfavorable behavior of the vehicle on the road in the case of short wheelbases of the vehicle. Compared with this it is the object of the present invention to provide an improved installation space concept, particularly for small cars and smallest vehicles in the automobile segment. Here, the installation space allocation is to make possible a shortened vehicle front overhang and smaller outer dimensions of the vehicle. In addition, the center of gravity position with respect to the behavior of the vehicle on the road is to improve. Furthermore, other aims, desirable features and characteristics will become apparent from the subsequent summary and detailed description, and the appended claims, taken in conjunction with the accompanying drawings and this background.

SUMMARY

An automobile is provided with a preferentially self-supporting body, a combustion engine and a transmission operationally connected to the engine. The engine in this case is substantially arranged in vehicle transverse direction. This means its crankshaft or output shaft substantially extends in vehicle transverse direction (y). In addition, the engine is arranged located behind the transmission seen in driving direction of the vehicle. With this engine and transmission arrangement an installation space concept and an installation space allocation are realized, wherein the engine seen in driving direction is arranged located behind the transmission and projecting to the front wall of the automobile body. This means the engine, from an arrangement located in front of or in the region of the front axle of the vehicle, is shifted further to the back, towards the vehicle middle. Because of this, the vehicle front overhang can be reduced and the center of gravity of the vehicle shifted further into the vehicle middle as well as further downwards. Here it is more preferably provided that the engine, relative to the vehicle transverse direction, is substantially arranged in the middle. Such a centered arrangement is an advantage for the weight distribution of the vehicle and for its cornering stability and for the behavior on the road.

According to an embodiment, the engine is arranged in vehicle longitudinal direction, relative to the driving direction, behind a front axle. This means the center of gravity of the engine or of the engine unit is located behind the front axle of the automobile seen in vehicle longitudinal direction. Here it can be additionally provided that the engine even in its entirety comes to lie behind the front axle of the automobile. Thus, an arrangement for example of differential, transmission and engine strung together opposite to the driving direction can be achieved. If the engine is shifted sufficiently far towards the vehicle middle the transmission operationally connected to the engine can come to lie between front axle and engine.

According to another embodiment, it is additionally provided that the engine with its side facing away from the driving direction comes to lie in a depression of the front wall of the vehicle body formed towards the vehicle back. Thus, the engine shifted in vehicle longitudinal direction towards the middle protrudes into the region of a center console of the passenger cell as a result of which through that depression in the vehicle front wall a hermetic separation of engine and passenger cell is still provided. However, the front wall has a bulge projecting into the passenger cell in a manner of speaking for accommodating or housing the engine shifted towards the vehicle middle.

According to another embodiment, it is provided here that the front wall depression or the front wall-sided mounting merges into a center tunnel of the vehicle body, more preferably of the body floor. Here it can be more preferably provided that the mounting or depression for the engine for example widening trapezium-like towards the front in driving direction in the direction of the back of the vehicle directly terminates in or merges into an approximately box or in cross section trapezium-like center tunnel profile. Advantageously it is additionally provided here that the center tunnel supports itself via at least one transverse tunnel to a side sill of the self-supporting body substantially extending in vehicle transverse direction. Advantageously, at least one transverse tunnel each is provided on both sides of the center tunnel which supports itself on the corresponding left or right side sill. The transverse tunnel or tunnels form a structure-stiffening corset for the floor region of the vehicle body. Through the transverse bracing provided by the transverse tunnel the torsional stiffness and torque stiffness of the body floor structure can be significantly improved. Furthermore supplementary stowage space for additional vehicle components can be made available through the transverse tunnel preferentially designed open towards the bottom and through the center tunnel correspondingly open towards the bottom.

According to another embodiment, it is provided that the center tunnel has a cross-sectional profile which substantially remains the same in vehicle longitudinal direction and protrudes as far as to a heel plate of the body. The center tunnel thus continuously extends from the front wall as far as to the heel plate. Thus it forms a continuous stowage and mounting region for additional components to be arranged in or on the lower floor of the vehicle.

According to another embodiment, the center tunnel and/or the at least one transverse tunnel acts as stowage space for energy storage modules. Thus, a fuel tank or vehicle batteries, more preferably for a hybrid or pure electric drive can for example be stowed in the middle or transverse tunnel region.

According to another embodiment of the transmission, which is located in front of the engine, is arranged relative to the vehicle transverse direction almost in the middle. Preferentially the engine and the transmission are arranged on a center longitudinal axis of the vehicle. With respect to the weight distribution and center of gravity position of the vehicle such a centered arrangement is particularly advantageous.

According to another embodiment, further preferred configuration it is additionally provided that the transmission is designed as continuously variable transmission, namely as a so called continuously variable transmission (CVT). By means of a CVT transmission the torque provided by the engine can remain in the region of the middle longitudinal axis of the vehicle and centrally transmitted to a differential coupled to the drive axle. Alternatively or additionally to a CVT transmission, multiple shaft transmissions can also be employed.

In a further embodiment, the engine is designed as a horizontal one or two-cylinder engine, while the stroke movement of the cylinders does not lie in the vertical but is substantially oriented horizontally or slightly inclined relative to the horizontal. More preferably through the realization of a horizontal one or two-cylinder engine the engine, relative to the vehicle longitudinal direction, can be shifted towards the vehicle middle without foot space available to the driver and/or the front passenger would be noticeably reduced as a result.

According to another embodiment, the engine is designed as a V2 or as a V3-engine, wherein the engine is arranged and oriented in such a manner that one of its cylinders directed to the back opposing the driving direction is substantially oriented horizontally. A horizontal orientation in this case means a stroke movement of the cylinder which substantially lies in the horizontal or only deviates from the latter to a minor extent, for example by a maximum of 15 to 30° thereof.

In a further embodiment, it is provided that the engine for maintenance or repair purposes can be pivoted about its drive axis downwards into a maintenance position. Advantageously, the engine in this case is suspended in a vibration-decoupled manner. For maintenance purposes, for example a toothed belt change, the engine, after disconnecting the suspension, can be pivoted downwards about the drive axis and out of the floor plane.

In addition, it is provided that the entire drive unit formed of engine, transmission and if applicable differential is mounted on a part frame or sub frame and fastened thereon, while not being directly connected to the body side members.

On the whole, improved crash behavior of the vehicle can also be achieved through the shifting of the vehicle drive to the bottom and to the back. The shifting of the drive, for example into the center tunnel region of the vehicle body can contribute to reducing load on the frame structure of the body located outside. The outer regions, for example the side sills and side members of the vehicle body thus merely have to remove energies and forces due to a collision in the event of a collision. Here, they merely have to provide to a smaller degree a holding function for the engine and the transmission.

BRIEF DESCRIPTION OF THE FIGURES

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
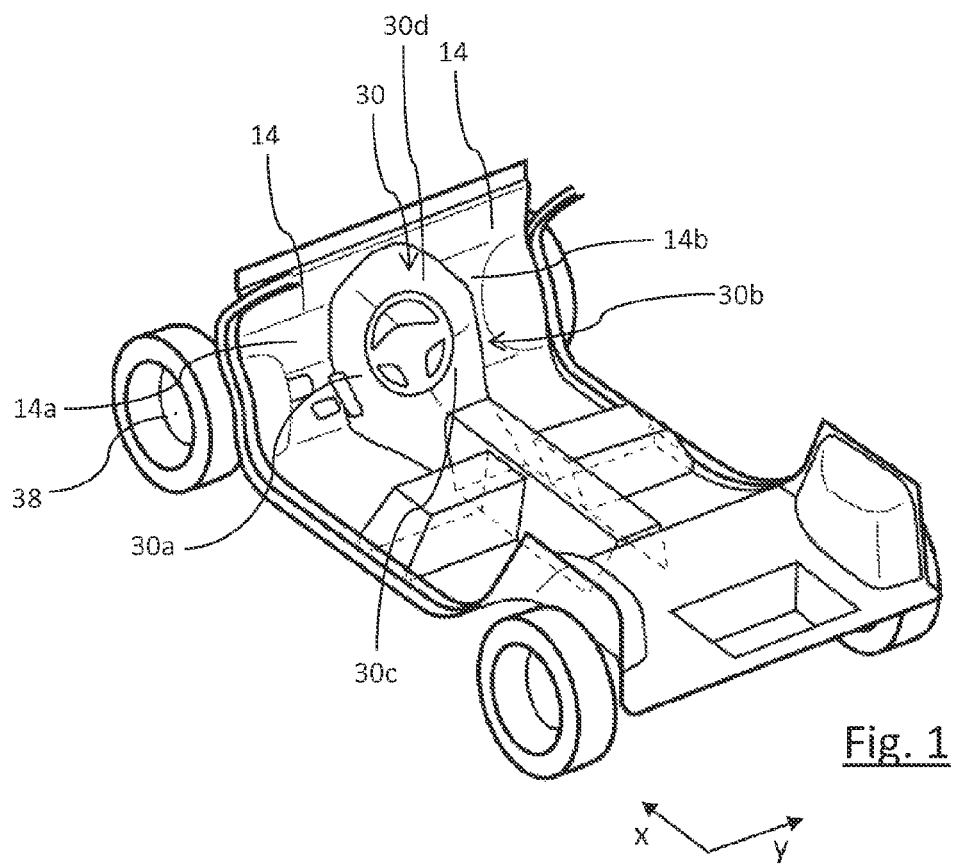
FIG. 1 is a schematic perspective representation of a automobile support structure obliquely from the back.
Figure 2:
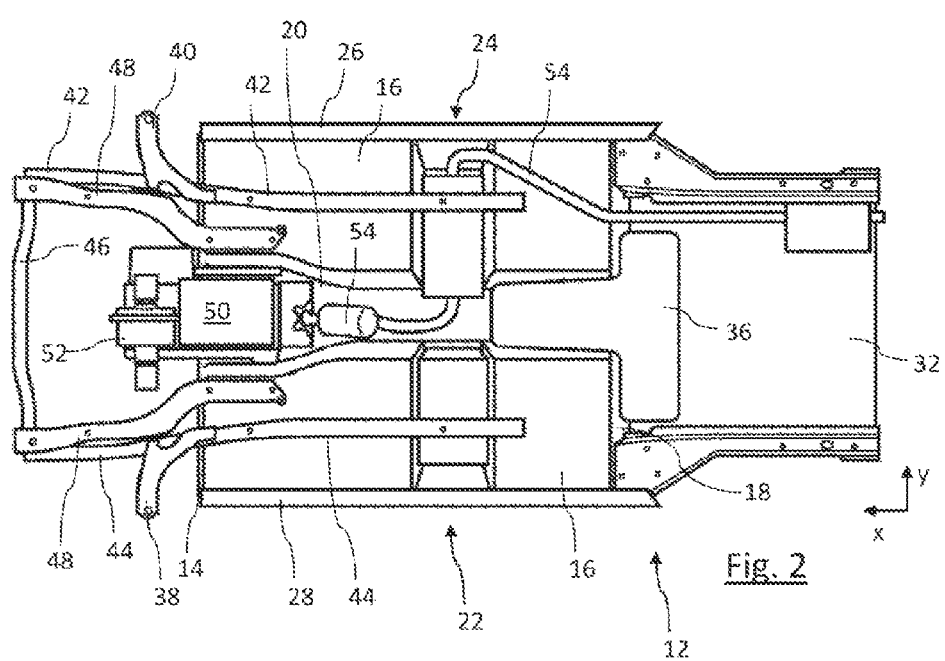
FIG. 2 is a further schematic representation of the body with drive components coming to lie therein in a top view from below.
Figure 3:
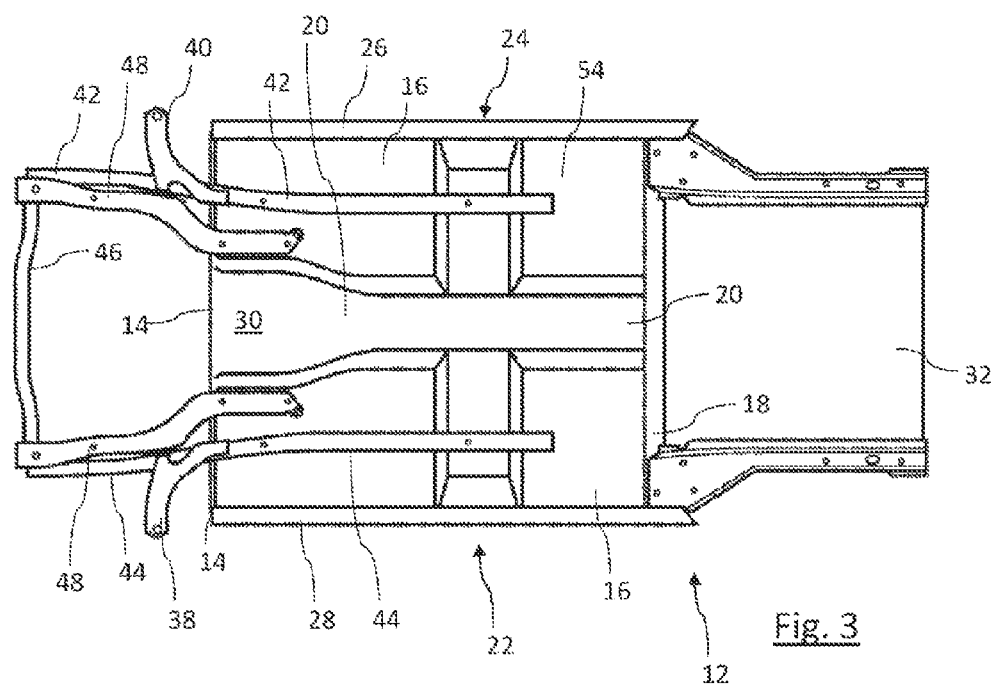
FIG. 3 is an isolated representation of the automobile support structure without drive components.

The automobile 10 schematically shown in FIG. 1 to FIG. 3 has a body, preferably a self-supporting body 12 as well as an engine 50 and a transmission 52 coupled to the engine 50. The body 12 comprises a floor structure in the shape of a floor plate 16, which in driving direction located at the front merges into a front wall 14 projecting upwards and via a heel plate 18 merges into a loading floor 32 to the back. In the region between front wall 14 and heel plate 18, in which the passenger cell of the vehicle is also located, the body has a tunnel structure 20, 22, 24 of cross-like appearance. Thus, a center tunnel extends in vehicle longitudinal direction (x) from the front wall 14 as far as to the heel plate (18). In vehicle transverse direction (y) two transverse tunnels 22, 24 are provided, wherein the right transverse tunnel 22 on the left borders on the center tunnel 20 and on the right on a side sill 28.

Accordingly, the left transverse tunnel 24 on the right borders on the center tunnel 20 and on the left on the left side sill 26. The center tunnel 20 towards the front, towards the front wall 14, merges into a tunnel widening 30 which can be unitarily designed with the front wall 14 and/or with the center tunnel 20. The tunnel widening 30 serves as housing and mounting for the engine 50 schematically shown in FIG. 2, which seen in driving direction of the vehicle is arranged behind the front-mounted transmission 52 shifted towards the vehicle center. As show, the area formed by the tunnel widening (or depression) 30 includes sidewall portions 30a, 30b, a rear portion 30c, and an upper portion 30d. The sidewall portions 30a, 30b extend into side portions 14a, 14b of the front wall 14.

In addition, the engine 50 with this configuration relative to the driving direction of the vehicle is located behind the front axle of the automobile which in the present exemplary embodiment simultaneously acts as drive axle. The position of the front axle is indicated by the body-sided wheel suspensions 38, 40, which in turn are fastened to the side members 42, 44 of the body. The engine 50 or the drive unit formed by engine 50 and transmission 52 is fastened to a part frame or sub frame 48, which seen in vehicle transverse direction is located within or between the two side members 42, 44. Side members 42, 44 and/or sub frame components 48 can additionally be interconnected via a cross member 46.

As additionally illustrated by means of FIG. 2, the engine 50 comes to lie in the region of the front wall 14. Through the tunnel enlargement 30 projecting in the direction of the passenger cell a kind of front wall-sided engine housing is created. On the whole, the position of the engine 50 and/or of the associated transmission 52 compared with previous installation space concepts is also shifted downwards, so that on the whole a center of gravity position shifted towards the vehicle center and towards the bottom can be achieved.

The center tunnel 20 as well as the transverse tunnel 22, 24 can serve to accommodate vehicle components such as an exhaust system 54. In addition, the vehicle tank 36 for example can protrude into a portion of the center tunnel 20. Thus, the fuel tank 36 seen in vehicle transverse direction can be arranged approximately centrally in the automobile and with a T-shaped basic structure extend from a spare wheel trough 34 forward as far as to the transverse tunnels 22, 24.

If the vehicle 10 for example is designed as hybrid vehicle battery modules can be accommodated in the position of the fuel tank 36 as well as in the transverse tunnels 22, 24, which because of their comparatively high weight contribute to a further downward shift of the center of gravity.

Figure 4:
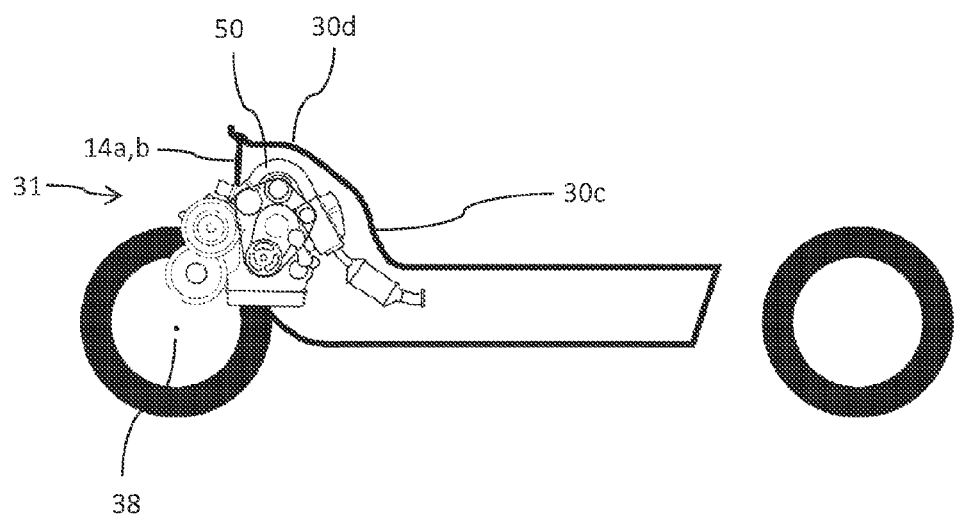
FIG. 4 is a representation of the automobile according to the FIG. 1 to FIG. 3 cut along the longitudinal axis.

The position of the engine 50 is evident in the sectional representation according to FIG. 4. The block of the engine 50 protrudes into the front wall 14 and at least in certain regions is encased by the widening 30 of the center tunnel 20 located at the front. As shown, the engine 50 is also arranged located comparatively deep in the vehicle 10, which brings with it a center of gravity shifted downwards.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. An automobile, comprising:
a body having side members configured to be coupled to a front axle;
a transmission;
a combustion engine viewed in a driving direction of the automobile that is arranged behind the transmission; and
a crankshaft of the combustion engine substantially oriented in an automobile transverse direction,
wherein the body includes a front wall with a first portion extending downward in a generally vertical direction on a first longitudinal side of the combustion engine and a second portion extending downward in the generally vertical direction from the first portion such that the first portion and the second portion form a depression at least partially housing the combustion engine, the depression positioned behind the front axle relative to the driving direction and extending in a rearward direction, the rearward direction being opposite to the driving direction,
wherein the depression forms a recess to receive a portion of the combustion engine, the portion of the combustion engine within the recess including a rearward-facing side and at least portions of laterally extending sides, the recess defining an opening facing the driving direction of the automobile to receive the portion of the combustion engine, and
wherein the body further includes a center tunnel, the center tunnel extending from the second portion of the front wall.

2. The automobile according to claim 1, wherein the combustion engine is substantially arranged centrally relative to the vehicle automobile transverse direction.

3. The automobile according to claim 1, wherein the combustion engine is arranged behind the front axle relative to the driving direction.

4. The automobile according to claim 1, wherein the center tunnel is self-supported via a transverse tunnel to a side sill substantially extending in the automobile transverse direction.

5. The automobile according to claim 4, wherein the transverse tunnel is configured as a stowage space for energy storage modules.

6. The automobile according to claim 1, wherein the center tunnel in a automobile longitudinal direction has a cross-sectional profile that remains substantially the same and protrudes as far as to a heel plate of the body.

7. The automobile according to claim 1, wherein the center tunnel is configured as a stowage space for energy storage modules.

8. The automobile according to claim 1, wherein the transmission relative to the automobile transverse direction is arranged almost centrally.

9. The automobile according to claim 1, wherein the combustion engine and the transmission are each arranged on a center longitudinal axis of the automobile.

10. The automobile according to claim 1, wherein the transmission is a continuously variable transmission (CVT).

11. The automobile according to claim 1, wherein the combustion engine is a horizontal one-cylinder engine.

12. The automobile according to claim 1, wherein the combustion engine is a horizontal two-cylinder engine.

13. The automobile according to claim 1, wherein the combustion engine is a V2-engine with a horizontally oriented cylinder facing to a back against the driving direction.

14. The automobile according to claim 1, wherein the combustion engine is a V3-engine with a horizontally oriented cylinder facing to a back against the driving direction.

15. The automobile according to claim 1, wherein the combustion engine is configured to pivot about a drive axis downwards into a maintenance position for maintenance.

16. The automobile according to claim 1, wherein the first portion and the second portion of the front wall are completely behind the front axle relative to the driving direction.

17. The automobile according to claim 1, wherein the opening of the recess is positioned behind the front axle relative to the driving direction.

18. The automobile according to claim 1, wherein the depression includes side walls extending from the recess in a substantially vertical direction.

* * * * *